(12) United States Patent
Yavuz et al.

(10) Patent No.: US 11,640,464 B2
(45) Date of Patent: May 2, 2023

(54) PROTOCOL MODEL LEARNING AND GUIDED FIRMWARE ANALYSIS

(71) Applicant: University of Florida Research Foundation, Inc., Gainesville, FL (US)

(72) Inventors: Tuba Yavuz, Gainesville, FL (US); Farhaan Fowze, Gainesville, FL (US); Kevin Raymond Boyce Butler, Gainesville, FL (US); Jing Tian, Gainesville, FL (US); Grant Haydock Hernandez, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 620 days.

(21) Appl. No.: 16/426,691

(22) Filed: May 30, 2019

(65) Prior Publication Data
US 2020/0380124 A1 Dec. 3, 2020

(51) Int. Cl.
*G06F 21/56* (2013.01)
*G06N 20/00* (2019.01)

(52) U.S. Cl.
CPC .......... *G06F 21/562* (2013.01); *G06N 20/00* (2019.01); *G06F 2221/033* (2013.01)

(58) Field of Classification Search
CPC .... G06F 21/562; G06F 21/563; G06F 21/566; G06F 2221/033; G06N 20/00
See application file for complete search history.

(56) References Cited

U.S. PATENT DOCUMENTS

| | | | | |
|---|---|---|---|---|
| 10,657,262 | B1* | 5/2020 | Cui | G06F 21/54 |
| 10,977,367 | B1* | 4/2021 | Adler | G06F 21/572 |
| 10,984,110 | B2* | 4/2021 | Eacmen, III | G06F 21/572 |
| 2013/0117853 | A1* | 5/2013 | Tsviatkou | G06F 21/563 726/23 |
| 2015/0199517 | A1* | 7/2015 | Rose | G06F 21/562 726/22 |
| 2019/0294802 | A1* | 9/2019 | Eacmen, III | G06F 21/572 |
| 2020/0380124 | A1* | 12/2020 | Yavuz | G06F 21/562 |

OTHER PUBLICATIONS

Costin, Andrei, et al. 4 Large-Scale Analysis Of The Security Of Embedded Firmwares. In Proceedings of the 23rd USENIX Conference on Security Symposium (USENIX Security 14. (2014). pn. 95-110. (Year: 2014).*
Palavicini et al., "Towards Firmware Analysis of Industrial Internet of Things (IIoT) Applying Symbolic Analysis to IIoT Firmware Vetting," Proceedings of the 2nd International Conference on Internet of Things, Big Data and Security (IoTBDS), 2017, pp. 470-477. (Year: 2017).*
Zaddach et al., "Avatar: A Framework to Support Dynamic Security Analysis of Embedded Systems Firmwares" (2014) 10.14722/ndss.2014.23229. (Year: 2014).*

* cited by examiner

*Primary Examiner* — Saleh Najjar
*Assistant Examiner* — Devin E Almeida
(74) *Attorney, Agent, or Firm* — Thomas | Horstemeyer, LLP

(57) ABSTRACT

The present disclosure describes a firmware analysis system and method that can generate a collection of protocol constraints from known firmware and apply the collection of protocol constraints towards an unknown firm to recognize protocol relevant fields and detect functionality within the unknown firmware.

20 Claims, 13 Drawing Sheets

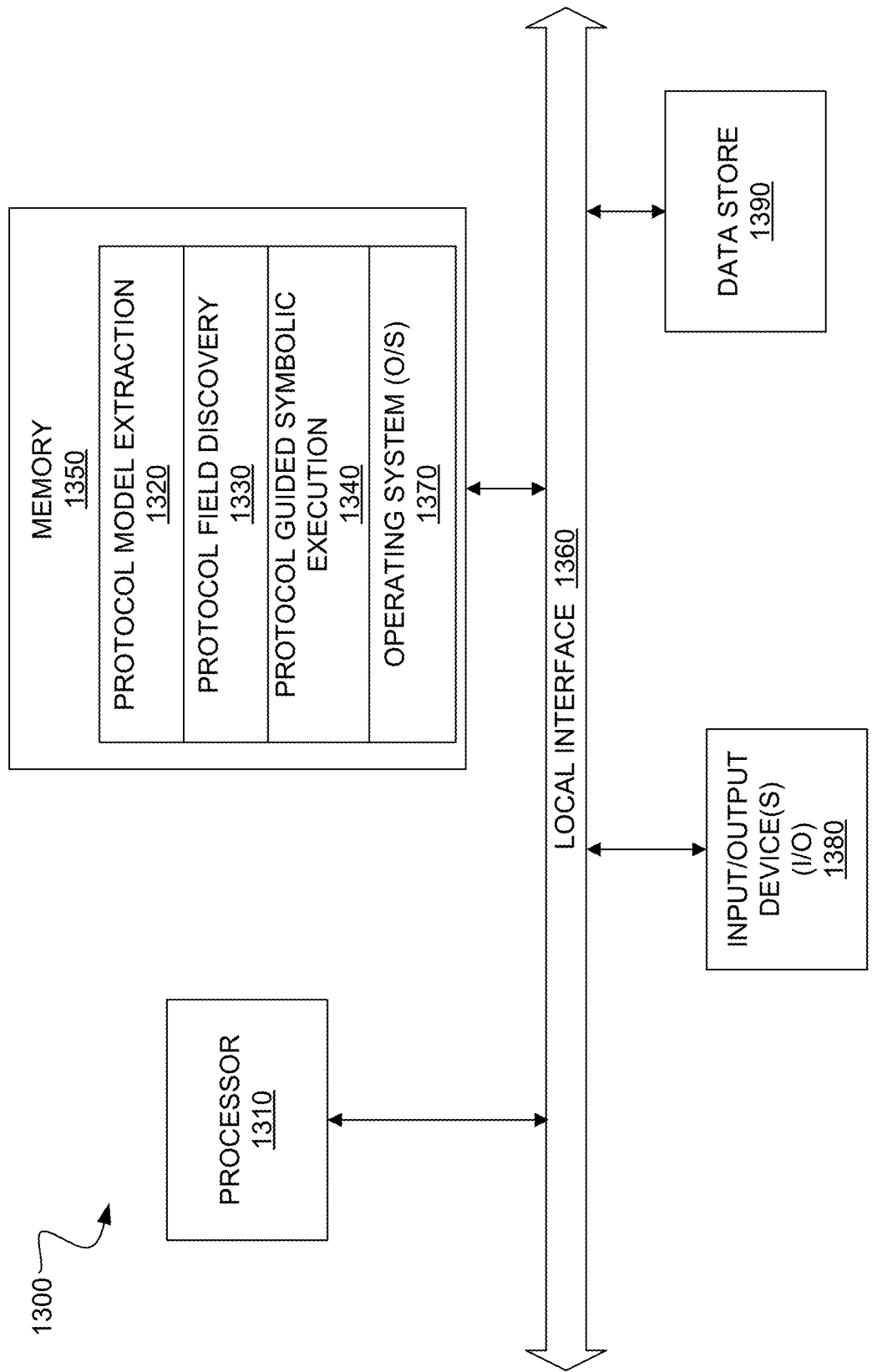

PROTOCOL MODEL LEARNING AND GUIDED FIRMWARE ANALYSIS

STATEMENT REGARDING FEDERALLY SPONSORED RESEARCH OR DEVELOPMENT

This invention was made with government support under grant contract numbers: CNS-1815883 (National Science Foundation) and 2018-TS-2846 (Semiconductor Research Corporation). The government has certain rights to the invention.

TECHNICAL FIELD

The present disclosure is generally related to computer software and firmware analysis.

BACKGROUND

The number of Internet of Things (IoT) has reached 7 billion globally in early 2018 and are nearly ubiquitous in daily life. Knowing whether or not these devices are safe and secure to use is becoming critical. IoT devices usually implement communication protocols such as USB and Bluetooth within firmware to allow a wide range of functionality. Thus analyzing firmware using domain knowledge from these protocols is vital to understand device behavior, detect implementation bugs, and identify malicious components. Different vendors often have their own protocol stack implementations based on their interpretation of a protocol specification. Unfortunately, due to the complexity of these protocols, there is usually no formal specification available that can check whether the firmware implements the protocol(s) correctly and/or help automate the firmware analysis. As a result, significant manual effort is currently required to study these protocols and to reverse engineer the device firmware. However, transforming an informal protocol specification into a formal representation is often infeasible due to the complexity of these protocols. For instance, the core Bluetooth 5.0 specification [3] has almost 3,000 pages excluding different application protocols (a.k.a., profiles).

Due to their interactions with the physical world, e.g., via sensors and actuators, and low-cost microcontroller architectures, IoT devices have a wide attack surface, which can be exploited to cause significant damage as in the case of the Mirai botnet. Analyzing the firmware of IoT devices for safety and security is becoming critical.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 13 is an exemplary computing device for a firmware analysis system in accordance with embodiments of the present disclosure.

DETAILED DESCRIPTION

Embodiments of the present disclosure improve the analysis of computer software and firmware by preparing a constraint-based protocol model for the soft/firmware and using the constraint-based protocol to analyze other soft/firmware. In one embodiment, an exemplary approach uses symbolic execution to extract protocol relevant constraints from firmware and then uses these constraints to prepare a constraint-based model for a protocol of interest. This approach differs from other approaches in that the extracted protocol constraint model is not used to improve the analysis of firmware (during training) from which the protocol constraint model gets extracted and is instead used to analyze unknown firmware.

Accordingly, a firmware analysis methodology using symbolic execution in accordance with an embodiment of the present disclosure can, during a training phase, learn a protocol model from known firmware, apply the model to recognize protocol relevant fields, and automatically detect functionality within unknown firmware. After the training phase, the firmware analysis methodology can fully automate the firmware analysis process while supporting a user's queries in the form of protocol relevant constraints. While the foregoing discussion is directed to firmware analysis, other embodiments of the present disclosure may be directed to software analysis in general.

In an exemplary embodiment, the firmware analysis methodology is applied to the USB protocol by learning a USB protocol constraint model from a set of 23 known USB firmware images. Protocol fields are then able to be mapped and USB functionality is automatically identified within all 6 unknown USB firmware. Experimental results demonstrate that an exemplary protocol constraint model is at least able to achieve high coverage of the USB specification for the two most important protocol fields and firmware analysis guided by the extracted protocol constraint model can achieve up to 73.8 times speedup in reaching USB protocol related targets, even if the knowledge of the mapping between the variables and the protocol fields is unknown. Thus, an exemplary firmware analysis methodology in accordance with the present disclosure provides a new method to apply domain knowledge to firmware analysis.

Figure 1:
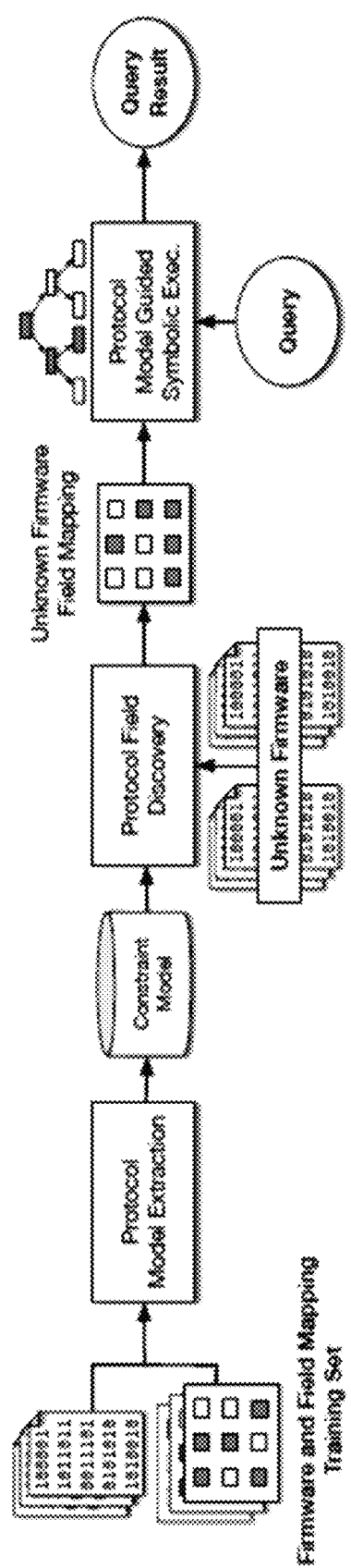
FIG. 1 is a diagram showing an exemplary embodiment of a firmware analysis system in accordance with the present disclosure.

As illustrated in FIG. 1, an exemplary embodiment of a firmware analysis system (also referred as ProXray in this disclosure) can learn and prepare a protocol constraint model (also referred simply as a protocol model) from known firmware and then apply the model to recognize the protocol and also identify functionality within unknown firmware automatically. As shown in the figure, ProXray has three stages or phases: Protocol Model Extraction, Protocol Field Discovery, and Protocol Model Guided Symbolic Execution.

As an overview, Protocol (Constraint) Model Extraction is concerned with learning a protocol constraint model of a firmware without having a formal specification of the firmware implementing a protocol. To do so, an exemplary firmware analysis system (ProXray) may use various path prioritization heuristics for symbolic execution to extract protocol field constraints by running some known firmware implementing the protocol. The protocol constraint model is a collection of those constraints. Once the protocol constraint model is available, ProXray can apply the model to an unknown firmware to recognize the protocol usage by mapping binary execution into protocol field constraints using symbolic execution. After protocol fields are identified, ProXray may accept queries in the form of protocol relevant data constraints, leverage the protocol constraint model again to accelerate path explorations in symbolic execution, and generate answers or responses to the queries.

In referring back to the Protocol Constraint Model Extraction Stage (first stage), ProXray extracts a formal protocol constraint model from known firmware and leverages the extracted model in the analysis of unknown firmware. FIG. 1 shows the data flow and major processing phases in one embodiment. As previously stated, the first stage or phase involves protocol constraint model extraction.

As a general background, model learning refers to inferring a model of software components. This model could be a Hidden Markov-Chain Model (HMM), for example, or relations between objects, class hierarchies, or implemented protocols. For the latter, protocol state transitions are often set as the learning target. Depending on the availability of the code in some analyzable form, either a black-box or a white-box method can be applied. White-box methods learn the model by analyzing the source code or the binary executable. When it is not feasible to analyze the implementation of a system under analysis, e.g., firmware, black-box methods are used to infer the state machines by observing the inputs and outputs of the program. Both passive learning and active learning are possible. In passive learning, the training data is labeled upfront. In active learning, however, labeling is performed on the specific instances when explicit queries are submitted. Unlike previous protocol learning techniques, ProXray targets learning of protocol constraints rather than a state machine of the protocol. Accordingly, ProXray is a type of a white-box and a passive model learning method.

Classical symbolic execution uses symbolic values for inputs and executes the instructions symbolically to propagate symbolic data flow among the program variables. When a branch instruction that involves a symbolic condition gets executed, multiple successors may potentially be created to represent the feasible paths in the program. Each path is associated with a symbolic expression, the path condition, to represent all decisions made on the symbolic inputs along that path.

Dynamic symbolic execution extends classical symbolic execution by mixing concrete and symbolic values to deal with challenging cases such as library calls and non-linear expressions. Concolic Testing and Execution-Generated Testing (EGT) are two specializations of dynamic symbolic execution. In Concolic Testing, the program is executed with concrete input values while computing both concrete states and symbolic states for variables that have symbolic values. It uses the symbolic path expressions to generate new concrete input values that can potentially execute new parts of the code. EGT, on the other hand, uses symbolic input values, keeps a symbolic state for the relevant variables, and performs concrete computation only when all the variables are concrete. So an EGT based symbolic execution engine, such as KLEE, can mix concrete inputs with symbolic inputs.

In general, symbolic execution of firmware poses challenges that do not exist for the symbolic execution of user space applications. These include specification of the architectural elements, e.g., special function registers of a specific microcontroller architecture, and the interrupt service routines (ISRs). FIE extends the KLEE symbolic execution engine to enable analysis of MSP430 firmware, enables specification of the microcontroller specific memory layout and symbolic regions as well as ISRs, and implements an approximate interrupt scheduling policy. In previous work, the present inventors have extended FIE with binary execution capability and a support for Intel 8051 firmware by developing an LLVM (Low Level Virtual Machine) lifter for Intel 8051 ISA and modeling the architectural elements.

In accordance with one embodiment of the present disclosure, ProXray uses the extended FIE to extract USB protocol relevant constraints from a set of 23 MSP430 firmware. The combination of extracted constraints are rewritten in terms of the protocol fields forms the learned protocol constraint model. In testing, ProXray and the learned model were used to test a set of firmware that consisted of four MSP 430 firmware images and two Intel 8051 firmware images to show the effectiveness of ProXray's approach in reaching protocol relevant targets and identifying the specific functionality implemented by these firmware images.

In certain embodiments, the availability of a representative set of firmware implementing the protocol of interest is assumed, which generally is a reasonable assumption as microcontroller vendors provide software developer packages (SDKs), e.g., the MSP430 SDK provided by Texas Instruments, for their boards and the associated toolchains. These developer packages demonstrate programming of both the microcontroller specific features and the communication protocols that they use. This type of program-based documentation of the protocol supplements the original protocol specification and helps developers understand how to program their firmware to use the protocol. SDKs often use identifier names that are similar to the protocol field names. Thus, in firmware that comes with an SDK, a simple text search often suffices to identify the variables that implement the protocol field names. Alternatively, certain embodiments of the firmware analysis system/method includes binary parsing/mapping support and are configured to recover the protocol fields from the binary format of the firmware using static analysis, such as by searching for certain binary patterns from within the binary version of the firmware.

In accordance with embodiments of the present disclosure, ProXray can leverage the domain knowledge encoded in such sample firmware to extract a constraint-based model of the protocol. As shown in FIG. 1, each firmware that is used in the training set is accompanied with a mapping of the protocol fields to the memory locations (program variables) in the firmware. In various embodiments, the mapping information needed for the model extraction phase is generated by scanning the source code of the sample firmware.

The protocol constraint model extraction stage takes the sample firmware along with the associated mapping between the protocol fields and the program variables. It performs symbolic execution on a set of training firmware in a way that prioritizes exploration of protocol-relevant paths. The main information that guides the symbolic execution of this stage is the protocol field mapping and the protocol-related symbolic program constraints extracted from various branches in the firmware as paths are explored.

One way of guiding the exploration is to prioritize paths that have explored new symbolic regions representing some of the protocol fields. Let us assume that the variables sdata and req of a firmware in the training set have been mapped to the USB protocol fields bmRequestType and bRequest, respectively, and further assume that a path has so far executed branch conditions involving the variable sdata. Therefore, if a successor of this path has recently executed a branch condition involving req while another successor has not executed such a branch condition yet, then the former path can be prioritized over the latter. Another way of guiding exploration is to prioritize paths based on the number of different branch conditions that they have executed. As an example, a path that has recently checked a new condition, e.g., sdata==1 in addition to sdata==0 should be prioritized over a path that has only checked sdata==0.

In one embodiment, protocol relevant program constraints are captured in a canonical form, m OP κ or m BOP κ1 OP κ2, where m, OP, BOP denote the memory location, a relational operator, and a bitwise operator and κ, κ1, and κ2 denote constants, respectively. Extracted protocol-relevant constraints are rewritten by replacing each variable of the firmware with the corresponding protocol field. Thus, the constraint model shown in FIG. 1 contains a set of canonical constraints, where the identifiers in the constraints correspond to some protocol field. Protocol constraints that are extracted from each firmware in the training set are eventually combined to represent the protocol constraint model. The protocol constraint model is leveraged by the second and third phases/stages of the firmware analysis system/method to uncover functionality of unknown firmware.

Algorithm 1 (below) presents an exemplary approach for extracting a protocol constraint model from a single firmware F in accordance with the Protocol Constraint Model Extraction Stage (first stage). It is noted that Algorithm 1 (and the algorithms that follow) assume that the underlying symbolic execution engine implements the Execution-Generated Testing (EGT) approach.

---

Algorithm 1 (Protocol Constraint Model Extraction Algorithm)

1: ExtractProtocolConstraints(F : Firmware, M : MemLoc → Identifier, $(C_{scope}$ : {perPath, perGroup}, $C_{cov}$ : {code, constraint, field}, : $C_{window}$ : $\mathcal{N}_T$ : $\mathcal{R}$ ): P(Constraint)

---

Algorithm 1 (Protocol Constraint Model Extraction Algorithm)

2: $s_0$ : SEState
3: Let $s_0$ denote the initial symbolic execution state/path for F
4: ActivePaths ← {$s_0$}
5: SC ← ∅
6: stashStack ← empty stack of SEState
7: newPaths ← ∅
8: toBeStashed ← ActivePaths
9: start the new window of size $Cw_{indow}$ for executing paths in ActivePaths
10: while $_T$ seconds not elapsed and ActivePaths ≠ ∅ do
11:   while exists some path in ActivePaths for which end of window has not been reached do
12:     s ← chooseNext(ActivePaths)
13:     update s's coverage based on $C_{cov}$ and the next instruction
14:     s.successors ← ExecuteNextInstruction(s)
15:     // Extract Protocol Constraints
16:     for each s' ∈ s.successors do
17:       Let Mem denote the memory locations that appear in s'.PC
18:       MMem ← {m \ m ∈ Mem ∧ M(m) ≠ undef}
19:       for each X ∈ ATOMIC(s'.PC) and m ∈ M Mem do
20:         if X ≡ m OP κ then
21:           SC ← SC ∪ {M(m) OP κ}
22:         else if X ≡ m BOP $κ_1$ OP $κ_2$ then
23:           SC ← SC ∪ {M(m) BOP $κ_1$ OP $κ_2$}
24:         end if
25:       end for
26:     end for
27:     // Filter States
28:     if $C_{scope}$ = perGroup then
29:       if not end of current window for s.successors then
30:         ActivePaths ← ActivePaths ∪ s.successors \ {s}
31:         toBeStashed ← toBeStashed ∪ s.successors \ {s}
32:         continue
33:       else // end of current window for s.successors
34:         ActivePaths ← ActivePaths \ {s}
35:         if s covers new based on $C_{cov}$ in the current window then
36:           newPaths ← newPaths ∪ s.successors
37:           toBeStashed ← toBeStashed \ s
38:         else // no new coverage by the end of the window
39:           toBeStashed ← toBeStashed ∪ s.successors \{s}
40:         end if
41:       end if
42:     else if s covers new based on $C_{cov}$ then // $C_{scope}$ = perPath
43:       newPaths ← newPaths ∪ s.successors
44:       toBeStashed ← toBeStashed \ s
45:       break
46:     end if
47:   end while
48:   // Update the stack of stashed paths
49:   if toBeStashed ≠ ∅ then
50:     stashStack.push(toBeStashed)
51:   end if
52:   // Determine the next frontier set
53:   if newPaths ≠ ∅ then
54:     ActivePaths ← newPaths
55:   else
56:     ActivePaths ← stashStack.top( )
57:     stashStack.pop( )
58:   end if
59:   newPaths ← ∅
60:   toBeStashed ← ActivePaths
61:   start the new window of size Cwindow
62: end while
63: return SC

---

Algorithm 1 takes as an input a mapping M from firmware memory locations to the protocol fields and configuration options (that are explained below), in which it uses symbolic execution to explore the paths in firmware F and returns a set of atomic constraints on the protocol fields. One challenge of symbolic execution is the path explosion problem, in which an exponential growth in the number of paths slows down the progress made for each path. Depending on the goal of the underlying analysis, the achieved coverage may be far from the ideal. A goal of ProXray is to explore the paths of the firmware that implement the protocol functionality while traversing as diverse a set of protocol relevant paths as possible. Although symbolic execution engines come with path exploration heuristics, such as those based on random selection and coverage, ProXray utilizes customized heuristics to maximize the unique number of protocol constraints extracted.

In accordance with an exemplary embodiment, three types of "knobs" are designed to fine tune the model extraction process. The first knob, $C_{cov}$, configures the type of coverage ProXray would like to measure as the exploration progresses. In addition to traditional code coverage, ProXray can also utilize constraint coverage and protocol field coverage. The second knob, $C_{scope}$, configures the scope of coverage computation, in which one possible scope of coverage is per-path and the other possibility is per-group (considering all active paths). The third knob, $C_{window}$, configures the duration of coverage computation, denoting the number of blocks executed.

Algorithm 1 keeps track of a frontier set of symbolic execution states or paths, ActivePaths, that is initialized with the initial state (line 4). Algorithm 1 keeps a stack of stashed paths, stashStack, representing all paths other than the current frontier set and to be considered later. The algorithm runs until a time bound τ is reached or the frontier set becomes empty. Each time ActivePaths is initialized, a window of size $C_{window}$ starts (lines 9 and 61). Until the window ends, paths in ActivePaths execute as in standard symbolic execution by choosing a path from the frontier set (line 12), updating coverage based on the type of coverage configuration (line 13), and executing the next instruction to compute possible successors (line 14).

After executing an instruction for a path s, the path conditions of the successors are analyzed (lines 16-26) to check the appearance of a new protocol relevant constraint. Algorithm 1 uses the protocol field mapping M to identify such protocol constraints (line 19), which are stored in the set SC (lines 21 and 23). Constraints are treated in a canonical form $pf_i$ OP κ or $pf_i$ & $κ_1$ OP $κ_2$, where $pf_i$ and OP denote a protocol field and a relational operator, respectively, and κ, $κ_1$, and $κ_2$ denote constants.

In addition to ActivePaths, Algorithm 1 keeps two sets of paths, newPaths and toBeStashed, denoting the next set of frontier paths and the paths from the current frontier set that will be stashed away. At the beginning of each window, newPaths and toBeStashed are initialized to empty set and ActivePaths, respectively (lines 7-8 and 59-60). Filtering of paths into the next frontier set and stashing of others depends on the configured scope of the analysis. If the scope is per group (lines 24-38), then filtering does not happen until all the paths in the frontier set reach the end of the current window. While inside the window, Algorithm 1 updates the frontier set (line 26) and the paths to be stashed away (line 27).

When a path reaches the end of the current window, the path is removed from the frontier set (line 30). If such a path achieves new coverage based on the type of coverage, its successors are added to the next frontier set (line 32) and the path is not considered for stashing (line 33). Otherwise, its successors are stashed (line 35).

If the scope is per path (lines 38-42), then new coverage is checked after each instruction execution (line 38) and handled immediately even if the end of the window is not reached yet. As in the per group case, when a path is filtered, the next set of frontier paths and the set of stashed paths get updated (line 39 and 40). Unlike in the per group case, when a path is filtered, the loop that executes the paths in the frontier set is exited (line 41).

After executing the paths in the current frontier set, Algorithm 1 pushes the stashed paths, if any, onto the stack (line 50) and updates the frontier set using the paths that have been filtered, if any (line 54). On the other hand, if no paths can be filtered from the frontier set, the next set of frontier paths is received from the top of the stack of stashed paths (lines 56 and 57).

Next, in the Protocol Field Discovery or second phase of the exemplary firmware analysis system, a given unknown firmware is analyzed to discover the mapping between the variables of the unknown firmware and the protocol fields. It should be noted that for arbitrary firmware, which may be in binary form only, it may not be feasible to do this manually. Therefore, an automated technique to discover this relationship between the firmware variables/memory regions and the protocol fields can be employed by ProXray in accordance with embodiments of the present disclosure. This is achieved by leveraging the protocol constraint model. In one embodiment, ProXray employs standard symbolic execution to explore some of the paths and compares the constraints in the path condition with those in the protocol constraint model for detecting semantic matching. Those constraints that match semantically provide potential mappings. Statistical information, i.e., the number of times a memory region is matched to a protocol field, may also be used to refine the discovered mapping.

A goal of protocol field discovery is to analyze an arbitrary firmware known or suspected to implement a protocol functionality and identify the set of potential memory locations corresponding to each data field of the protocol. The idea is to use symbolic execution to explore paths of the firmware under analysis and utilize the protocol constraint model that has been extracted for this discovery process.

Algorithm 2 (below) presents the details of an exemplary protocol field discovery algorithm in accordance with the Protocol Field Discovery (second phase/stage).

| Algorithm 2 (Protocol Field Discovery Algorithm) |
| --- |
| 1:     DiscoverProtocolFields(F : Firmware, PM : P(Constraint), <br>        PF : P(Identifier)$_T$ : $\mathcal{R}$ ) : Identifier →P(MemLoc) |
| 2:     Let M,$M_{best}$ : Identifier →P(MemLoc) |
| 3:     M,$M_{best}$ ← λx.∅ |
| 4:     Let Freq : MemLoc → Identifier → $\mathcal{N}$ |
| 5:     Freq ← λx.λy.0 |
| 6:     Let $s_0$ denote the initial symbolic execution state/path for F |
| 7:     ActivePaths ← {$s_0$} |
| 8:     while $_T$ seconds not elapsed and ActivePaths ≠ ∅ do |
| 9:        s ← chooseNext(ActivePaths) |
| 10:       s. successors ← ExecuteNextInstruction(s) |
| 11:       ActivePaths ← ActivePaths ∪ s.successors \ {s} |
| 12:       for each s' ∈ s.successors do |
| 13:           for each $c_{pc}$ ∈ ATOMIC(s'.PC) do |
| 14:             for each pf ∈ Identifier do |
| 15:                if ∃c ∈ PM. (isValid(c ↔ $c_{pc}$[pf/m]) then |
| 16:                   M ← M[pf ← M(pf) ∪ {m}] |
| 17:                   Freq ← Freq[(m, pf) ← Freq(m, pf) + 1] |
| 18:                end if |
| 19:             end for |
| 20:           end for |
| 21:        end for |
| 22:     end while |
| 23:     $M_{best}$ ← λpf.{m \ Freq(m, pf) = $MAX_{pfi \in PF}$ (Freq(m, pfi))} |
| 24:     return $M_{best}$ |

The inputs for Algorithm 2 include a set of atomic constraints over protocol fields PM, the set of protocol fields PF, and a time threshold τ. The algorithm returns mappings between the protocol fields and a set of memory locations (program variables) utilized by the firmware. Algorithm 2 collects candidate mappings as it explores program paths by running the standard symbolic execution algorithm. When a path condition is updated, it checks to see if each constraint in the path condition matches some constraint in the protocol model. If so, Algorithm 2 maps the memory location that appears in the matching constraint from the path condition to the protocol field constraint (line 15). It also updates a frequency function that keeps track of the number of unique matches that have been observed between a memory location and a protocol field (line 16).

By the time the symbolic execution stage terminates during training, Algorithm 2 has some mappings between protocol fields and sets of memory locations, M, and the number of times a match has been observed between two entities, Freq. ProXray chooses the candidate mapping with the highest frequency as the final mapping (line 21). The main idea behind this selection is that the more number of times a protocol field has been matched to a memory location, the more confidence we have that the match is correct.

For the Protocol (Constraint) Model Guided Symbolic Execution or third phase/stage, ProXray leverages the discovered mapping for an unknown firmware to perform protocol-guided symbolic execution in accordance with embodiments of the present disclosure. Thus, a goal of this stage is to use an extracted constraint-based model of a protocol (using a representative set of firmware) to perform guided symbolic execution in new unknown firmware. Therefore, another goal is to steer the execution into the specific parts of the program. ProXray utilizes the extracted protocol constraint model to guide symbolic execution to explore paths that implement protocol related functionality. For the third stage, it is assumed that the protocol field discovery has already been performed on the firmware of interest in stage 2 and that a specific protocol constraint has been specified in terms of the fields of the protocol representing a specific protocol functionality in stage 1.

Accordingly, in one embodiment, inputs for the third stage include an unknown firmware that has not been analyzed with respect to protocol use, the discovered mapping between the firmware variables and the protocol fields, and a functionality query in the form of a protocol constraint representing the functional part of the protocol of interest. For example, to map protocol fields and identify USB functionality, the ProXray may answer a query such as "Does the firmware contain a USB keyboard functionality?" within the unknown USB firmware images. Note, in this example, that the query helps to focus the analysis to a specific functionality of the USB protocol.

In accordance with the present disclosure, an exemplary guided symbolic execution rewrites the input protocol constraint to reflect all possible mappings that have been discovered. As an example, in one of the USB firmware that was examined during testing, the bmRequestType field was implemented by the variable tSetupPacket.bmRequestType. So, the constraint bmRequestType==161 can be rewritten as tSetupPacket.bmRequestType==161 if bmRequestType has been mapped to {tSetupPacket} and can be rewritten as tSetupPacket.bmRequestType==161 V sdata==161 if bmRequestType has been mapped to {tSetupPacket, sdata} to reflect all possible candidate mappings. Then, a customized pruning algorithm can be applied to expand the paths that satisfy the transformed protocol constraint. Such protocol-guided analysis of unknown firmware can be used for various applications such as checking whether an unknown firmware handles a given protocol constraint and discovering the functionality class(es) an unknown firmware implements.

Algorithm 3 (below) presents a protocol model guided symbolic execution algorithm in accordance with an embodiment of the present disclosure.

---

Algorithm 3 (Protocol Guided Symbolic Execution Algorithm)

1: ProtocolGuidedSymEx(F: Firmware, C: Constraint, M:
   Identifier →P(MemLoc), $T: \mathcal{R}$ ): P(SEState)
2: Let $C \equiv \bigvee_{i=1}^{N} \bigwedge_{j=1}^{k_i} c_{ij}$ 3: Let $T(c) = \begin{cases} \bigvee_{m \in M(pf)} c[m/pf] & M(pf) \neq \emptyset \text{ // case 1} \\ true & \text{otherwise // case 2} \end{cases}$ 4: Let $C' \equiv \bigvee_{i=1}^{N} \bigwedge_{j=1}^{k_i} T(c_{ij})$
5: Let $s_0$ denote the initial symbolic execution state / path for F
6: ActivePaths ← $\{s_0\}$
7: while $T$ seconds not elapsed and ActivePaths ≠ do
8:     s ← chooseNext(ActivePaths)
9:     s.successors ← ExecuteNextInstruction(s)
10:    filtered, pruned ← false
11:    filteredPaths ← ∅
12:    for each s' in s.successors do
13:        if s'.PC ∧ C' ≠ false then
14:            filtered ← true
15:            filteredPaths ← filteredPaths ∪ {s'}
16:        end if
17:        if s'.PC ∧ C'= false then
18:            pruned ← true
19:        end if
20:    end for
21:    if filtered ∧ pruned then
22:        ActivePaths ← filteredPaths
23:    else
24:        ActivePaths ← ActivePaths ∪ filteredPaths \ {s}
25:    end if
26: end while
27: return ActivePaths

---

The inputs for Algorithm 3 include a protocol constraint C, discovered mappings from protocol fields to a set of memory locations M, and a time threshold τ. Algorithm 3 transforms the input protocol constraint into a program constraint by utilizing the mapping M (line 4). If a protocol field is mapped to a nonempty set of memory locations (program variables) (line 3, case 1), then each memory location is considered to be legitimate separately and the constraint is rewritten by replacing the protocol field with that memory location. Constraints that are obtained through rewriting are combined using the disjunction operator. However, if a protocol field cannot be mapped to a memory location (line 3, case 2), the constraint is replaced with true.

Algorithm 3 keeps a set of frontier paths, ActivePaths, and starts the symbolic execution from the initial symbolic execution state for firmware F. As in standard symbolic execution, it chooses the next path to execute (line 8) and executes the instruction to produce the successors (line 9). Some of the successors may be filtered (lines 13-16) and some of them may be pruned (line 17-19). Algorithm 3 keeps a set to record which successors of the current path gets filtered in filteredPaths, which has been initialized to an empty set at line 11. Path condition of each successor will be checked to decide if it satisfies part of the transformed protocol constraint. If so, the successor will be added to the set of filtered paths (line 15). If there are filtered paths as well as pruned paths, the frontier set is updated with the filtered successors of the current path. Otherwise, the frontier set is expanded with the filtered successors (line 24). The purpose behind this step is to detect branches where decisions related to the protocol constraint are made and to aggressively replace the active paths with the successors of the current path that make decisions consistent with the constraint. At branches without constraints related decisions, Algorithm 3 preserves the current active set by expanding it with all the successors.

The effectiveness of Algorithm 3 in steering the execution to the desirable part of the program depends on the precision of the mapping between the protocol fields and the memory locations provided as an input. For example, in one extreme case, each protocol field might be mapped to an empty set and the transformed constraint would evaluate true. In another extreme case, each protocol field might be mapped to a large set of memory locations yielding a large transformed constraint. In both cases, steering the execution to the relevant part of the program will not be effective as effective pruning will not be achieved. Moreover, the latter will have an additional overhead in terms of constraint solving due to the size of the transformed constraint.

To demonstrate the effectiveness of an exemplary embodiment of the firmware analysis system, the USB (Universal Serial Bus) protocol was selected as a case study for ProXray because of its ubiquity in embedded systems and Internet of Things (IoT) devices. On one hand, the core USB specification, e.g., USB 2.0 or USB 3.0 is still approachable with few hundreds of pages. On the other, its ability to support versatile functionality via different USB classes also reflects the challenges in firmware analysis. Nevertheless, in accordance with embodiments of the present disclosure, ProXray is designed to be protocol agnostic so that it can be applied to other protocols such as Bluetooth and NFC.

Within the USB protocol, each USB class defines one kind of functionality. Different USB classes introduce their own request/response messages, which follow the standard request/response structure defined in the USB specification. The most common classes are Communication Device Class (CDC), Human Interface Device (HID), and Mass Storage Class (MSC).

Figure 2:
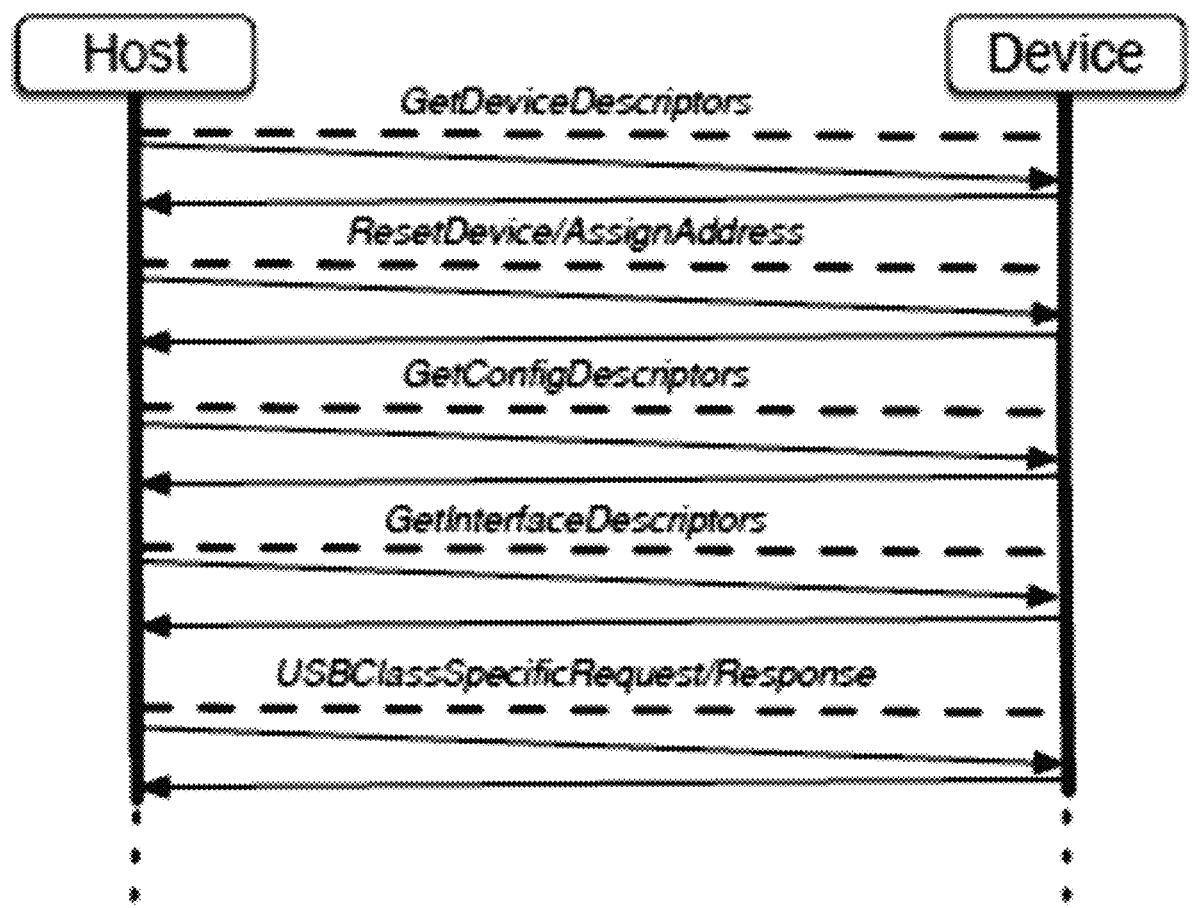
FIG. 2 is a flow diagram of a Universal Serial Bus (USB) enumeration procedure in accordance with an embodiment of the present disclosure.

As shown in FIG. 2, all USB devices follow the same procedure called enumeration once plugged into the host machine. Initiated by the host, this procedure is used to provide the device configuration information, including GetDeviceDescriptors, GetConfigDescriptors, and GetInterfaceDescriptors. Once the enumeration phase is complete, the corresponding device driver loaded by the operating system (OS) starts to serve the device using USB class-specific requests.

Figure 3:
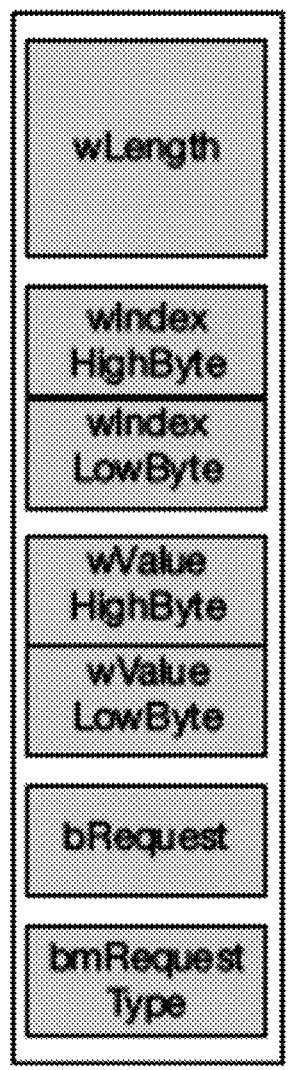
FIG. 3 is a diagram of a USB setup packet for an enumeration procedure in accordance with an embodiment of the present disclosure.

As shown in FIG. 3, all USB requests start with a Setup packet, which is an 8-byte structure containing 1-byte bmRequestType and bRequest fields, and 2-byte wValue, wIndex, and wLength fields. bmRequestType is a bitmap determining data transfer direction, type, and recipient. bRequest is the request code defined by the USB and class-specific specs. Both wValue and wIndex are separated into low and high bytes, which act as parameters passed by a given request type. wLength shows the number of bytes to be transferred during the data stage if one exists.

FIE is a firmware analysis tool that leverages KLEE to perform symbolic execution on MSP430 firmware. In one embodiment, ProXray extends FIE to record all conditions evaluated on any protocol field while executing the training firmware set. The core execution engine of FIE considers every read from a symbolic memory region independently and as a new version of that location on the executing path. As a result, every read from a specific memory creates a new node in the underlying abstract syntax tree (AST) used for representing symbolic expressions. This procedure helps in capturing the dynamic interactions between the firmware and its environment. However, this procedure complicates the model extraction as the ProXray has to deal with multiple versions of the same memory location. To get the unique constraints imposed on each protocol field, an embodiment of the ProXray first finds the memory regions used in each branch condition in which a custom expression AST traversal was developed to emit the atomic constraints from the branch conditions. If the memory region in the atomic constraint turns out to be a protocol field, ProXray rewrites the conditional expression in terms of that protocol field. For every such expression, the uniqueness of that constraint is evaluated using validity checking interface of the Simple Theorem Prover (STP), which is the SMT solver that FIE uses. If the new conditional expression turns out to be different from all the constraints in the model, ProXray accepts it as a newly found unique constraint. In one embodiment, the unique constraints are stored in the syntax of the KQuery language.

Additionally, the KQuery language may be used in specifying protocol relevant queries for guided execution. Based on the protocol field mapping found for the firmware under test, ProXray rewrites these queries in terms of the mapped memory regions of the firmware. In one embodiment, ProXray utilizes the caching solver provided by KLEE in all phases to minimize the runtime overhead.

To evaluate its effectiveness, ProXray was applied on the USB development package available from MSP's USB developer site and two Intel 8051 firmware, Phison BadUSB firmware and EzHID firmware. The MSP430 package is provided as an example for USB firmware developers working on the MSP430 architecture. It contains a rich set of example firmware images with each demonstrating a different use-case of the USB protocol. In general, a single firmware image focuses on a specific device class, except for the composite firmware, which combines functionalities from multiple classes.

For analysis, the firmware was divided into the training set and the testing set. In particular, the training set contained 23 firmware images from the MSP430 package, implementing 3 different USB classes, including Communication Device Class (CDC), Human Interface Device (HID), and Mass Storage Class (MSC). The testing set contained 6 firmware, including another 4 firmware from the MSP430 package and 2 Intel 8051 firmware. Table 1 (below) shows the individual firmware images and their size while Table 2 (below) shows the number of firmware images by the USB class type along with the quantitative details on the unique constraints extracted for each. Evaluation was performed for the Protocol Constraint Model Extraction stage using the training set, the Field Discovery stage using the testing set, and the Protocol Constraint Model Guided Symbolic Execution stage using the testing set.

TABLE 1

| Training Set | |
|---|---|
| Firmware Name | Lines of Code |
| CDC Examples | |
| C0_SimpleSend | 18,764 |
| C1_LedOnOff | 18,855 |
| C2_ReceiveData | 18,764 |
| C3_EchoToHost | 18,493 |
| C4_PacketProtocol | 18,429 |

TABLE 1-continued

Training Set

| Firmware Name | Lines of Code |
|---|---|
| C5_SendDataWaitTillDone | 18,323 |
| C6_SendDataBackground | 18,269 |
| MSC Examples | |
| M2_SDCardReader | 19,128 |
| M3_MultipleLUN | 20,403 |
| M4_DoubleBuffering | 19,053 |
| M5_CDROM | 23,055 |
| HID Examples | |
| H0_SimpleSend | 18,777 |
| H1_LedOnOff | 18,850 |
| H2_ReceiveData | 18,540 |
| H3_EchoToHost | 18,404 |
| H4_PacketProtocol | 18,476 |
| H5_SendDataWaitTillDone | 18,491 |
| H6_SendDataBackground | 18,432 |
| H7_Mouse | 18,649 |
| H8_Keyboard | 18,876 |
| H9_Remote_Wakeup | 18,865 |
| H10_ReceiveData_EncryptDecryp | 18,911 |
| H11_LedOnOff_EncryptDecrypt | 18,724 |
| Test Set | |
| CC1_term2term | 18,946 |
| CH1_term2hidDemo | 18,640 |
| CHM1_term2HidDemo_2LUN | 24,287 |
| HH1_hidDemo2hidDemo | 18,647 |
| BadUSB_Firmware | 1,696 |
| EzHID_Firmware | 8,683 |

TABLE 2

| | | CBE | | | BSE | | |
|---|---|---|---|---|---|---|---|
| Type | FW# | Min. | Max. | Avg | Min. | Max. | Avg |
| CDC | 7 | 37 | 42 | 40 | 18 | 24 | 22 |
| HID | 12 | 34 | 41 | 38 | 19 | 33 | 27 |
| MSC | 4 | 34 | 39 | 37 | 27 | 30 | 29 |

Figure 4:
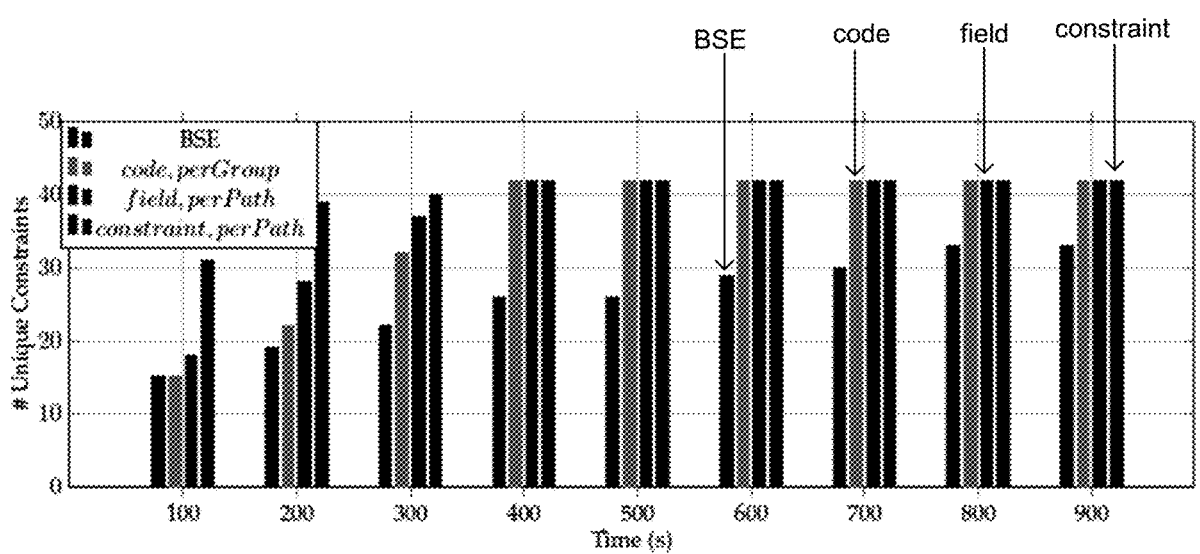
FIGS. 4-5 are diagrams displaying an average number of constraints recovered at different time intervals during experimental testing of an exemplary firmware analysis system in accordance with embodiments of the present disclosure.
Figure 5:
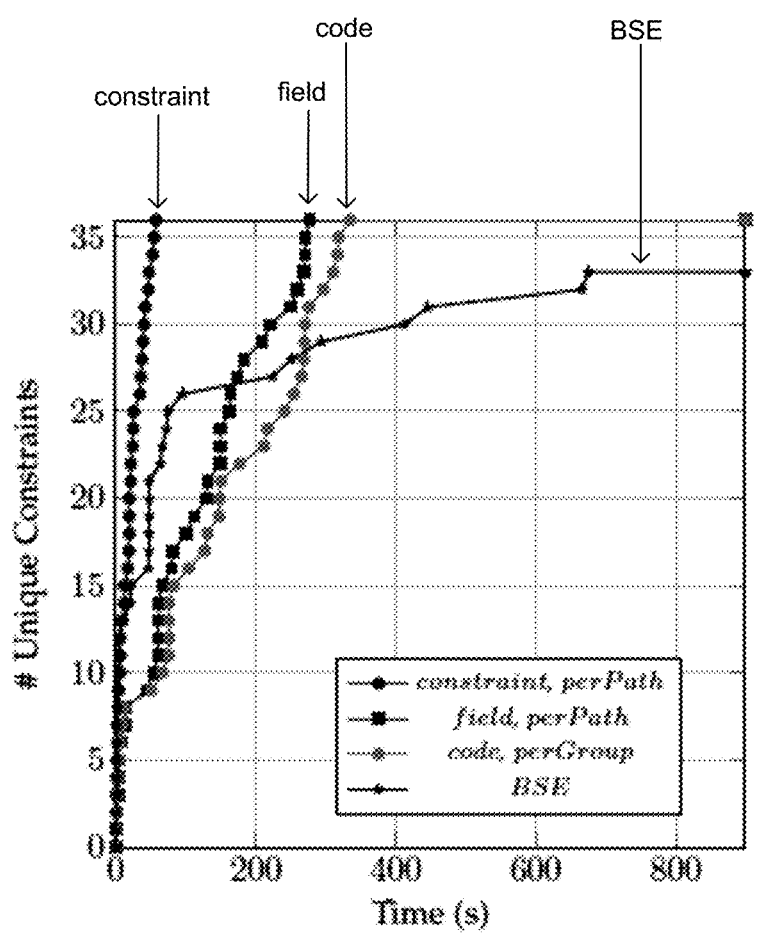

From our analysis, it was found that all of our heuristics provided in Algorithm 1 perform better than a baseline symbolic execution (BSE), i.e., they extract more protocol information from the training firmware set in a given amount of time compared to BSE as shown in FIG. 4, which shows the average number of unique constraints extracted over a period of 15 minutes (900 s). The graph in FIG. 5 shows model extraction data for an HID benchmark on which BSE showed its best performance among all benchmarks. From the test results, even in the best case of BSE, heuristics of the ProXray achieve much better performance than BSE.

The USB host request in the USB protocol is dependent on five fields: bmRequestType, bRequest, wValue, wIndex, and wLength. To extract the protocol constraint model from a given firmware, the addresses of these protocol relevant fields within that firmware are provided as an input to Algorithm 1 so that the relevant memory locations can be tracked throughout the symbolic execution. The following configuration parameters are used to control the exploration during constraint extraction: $C_{cov}$, $C_{scope}$, and $C_{window}$.

$C_{cov}$ denotes the coverage criteria, which can be code, constraint, or field coverage. Code coverage is used to prioritize paths that cover new instructions, constraint coverage prioritizes paths that lead to more unique condition extraction, and field coverage prioritizes paths based on the visibility of multiple fields in a certain path. Depending on the firmware's implementation, each of these criteria has unique advantages. For a small firmware with few branches or paths code based coverage may be enough to extract information. On the other hand, for a large firmware with many branches, constraint coverage may be more suitable, since constraint coverage can produce better yield in a short amount of time by prioritizing paths that provide new constraints. And, field coverage shows faster extraction of constraints deeper in the code which involve multiple protocol fields.

$C_{scope}$ denotes the scope for which the coverage is evaluated and can be perPath and perGroup, while $C_{window}$ specifies the granularity of the window for executing the paths in the frontier set. $C_{window}$ is given in terms of the number of basic blocks. $C_{scope}$ combined with $C_{window}$ determines the frequency of action taken based on $C_{cov}$. In a perPath scoping, the frontier set gets updated every time new coverage is achieved. However, for perGroup scoping, updating the frontier set is delayed until all paths have executed $C_{window}$ number of blocks. There are six possible configurations based on the values of $C_{cov}$ and $C_{scope}$. After combining these with window sizes from one through ten, it was observed that too small a window size does not let paths cover much area and too large a window size lets all paths cover something new. Thus, window sizes of 4-7 were found to perform better in all cases than others. Accordingly, for the experimental results in FIG. 5, $C_{window}$=5. Due to space restrictions, the best performing combinations for each $C_{cov}$ are discussed next. We should note that all configurations discussed below could extract on average 33 unique constraints by the end of the analysis window, which was set to 900 seconds.

In a first configuration, $C_{cov}$=code and $C_{scope}$=perGroup. This configuration was found to be closest to BSE. By focusing on paths with better code coverage, number of paths to execute were reduced and led to more constraint extraction. As FIG. 4 shows, this configuration extracts the least number of unique constraints compared to the other two configurations (below) in the early phases of the analysis. Using perPath scope with code coverage achieves worse performance as only one path is chosen until it stops achieving new coverage. So, it may cause divergence from the protocol relevant parts of the code.

In the second configuration, $C_{cov}$=field and $C_{scope}$=perPath. This configuration performed slightly better than the first configuration (above) as it extracts more constraints in the early phases as shown in FIG. 4. Here, protocol field based extraction performed better than instruction coverage because it better relates to our goal of a protocol-guided analysis of unknown firmware. For this configuration, paths were chosen based on finding new protocol fields. For example, if a path sees at least one new protocol field, ProXray expands on that path and stop executing it when it does not reach any new protocol field in the given window. Since the scope is per path, the window size only comes into play when there is no field coverage. On the other hand, $C_{scope}$=global with field coverage performs worse than the second configuration as it delays the execution of the preferred paths but still performs better than BSE.

For the third configuration, $C_{cov}$=constraint and $C_{scope}$=perPath. This configuration produces the best result as it extracts more constraints that the other configurations in a given amount of time as shown in FIG. 4. This approach is most related to the goal of protocol-guided analysis. Since we want to extract as many unique constraints as possible from a firmware, a ProXray can be configured to choose a path that provide us with constraints that have not been seen yet and only the constraints on protocol fields are considered while evaluating paths. In comparison, the perGroup scope combined with constraint coverage performs slightly worse than the third configuration as it executes more paths in the same time which delays extraction compared to perPath scope and performs much better than all other combinations.

During experimental testing, we extracted 58 unique constraints in total across three different USB classes. Table 2 shows the number of constraints for each class of firmware. It is important to note that the extracted constraints come in different formats. For example, two constraints on bmRequestType are ((bmRequestType & 128)≠0) and (bmRequestType==161). Both constraints appear on the same path and the latter satisfies the former. The first is used to identify the direction of the request, i.e., from host to device or device to host. The second is used to identify the specific request. All extracted constraints were examined to find all possible values for each protocol field contained and to list the number of unique values for each field in Table 3 (below) based on the 23 firmware in the training set.

TABLE 3

| Type | bmRequestType | bRequest | wValue | wIndex | wLength |
|---|---|---|---|---|---|
| CDC | 10 | 12 | 6 | 4 | 5 |
| HID | 9 | 10 | 5 | 3 | 10 |
| MSC | 10 | 11 | 5 | 3 | 4 |

Both bmRequestType and wIndex share the same possible values among all these classes. For wIndex, the variation is limited. In most cases, the default value is zero. For bmRequestTypes, which tells the data transfer direction, recipient, etc., each value can also be reused by different USB requests. This means that given enough USB requests, it is possible to enumerate every bmRequestType permitted for this USB class. bRequest shows minor differences among different classes due to the class-specific USB requests. Other fields vary since they heavily rely on the semantics of the USB request.

The values found in the constraints for bmRequestType and bRequest were then examined by extracting all possible values explicitly listed in different USB specifications for these fields and comparing the values found in the constraints with the ones included in the specifications. The coverage for these fields are shown in Table 4 (below).

TABLE 4

| Type | USB 2.0 | CDC 1.2 | HID 1.11 | MSC 1.3 |
|---|---|---|---|---|
| bmRequestType Coverage | | | | |
| CDC | 6/6 | 2/2 | — | — |
| HID | 5/6 | — | 3/4 | — |
| MSC | 5/6 | — | — | 2/2 |
| bRequest Coverage | | | | |
| CDC | 9/11 | 8/39 | — | — |
| HID | 9/11 | — | 7/8 | — |
| MSC | 9/11 | — | — | 3/5 |

For bmRequestType, all three classes of firmware show a minimum 83% and even 100% coverage on the standard USB 2.0. This is expected since different USB classes still follow the enumeration procedure using the standard USB requests. We also find 75% and 100% coverages on CDC 1.2, HID 1.11, and MSC 1.3 class-specific protocols accordingly based on different classes of the firmware.

For bRequest, all these three classes of firmware show an 82% coverage on the standard USB requests defined by USB 2.0. The only missing ones are "SET DESCRIPTOR" and "SYNCH FRAME", which are optional or only used by audio streaming devices. CDC firmware shows the lowest coverage comparing to the CDC 1.2 specification due to a large number of requests defined by its four different sub specifications, including Public Switched Telephone Network (PSTN), Integrated Services Digital Network (ISDN), Ethernet Control Model (ECM), and Abstract Control Model (ACM). HID firmware demonstrates 87.5% coverage comparing to the HID 1.11 specification. Both of the two requests defined by the MSC 1.3 specification, but not covered by our MSC firmware, are for Lockable Mass Storage devices which is a different kind of MSC devices. Each firmware sample used during the model extraction and its bmRequestType and bRequest coverage were further investigated.

Figure 6:
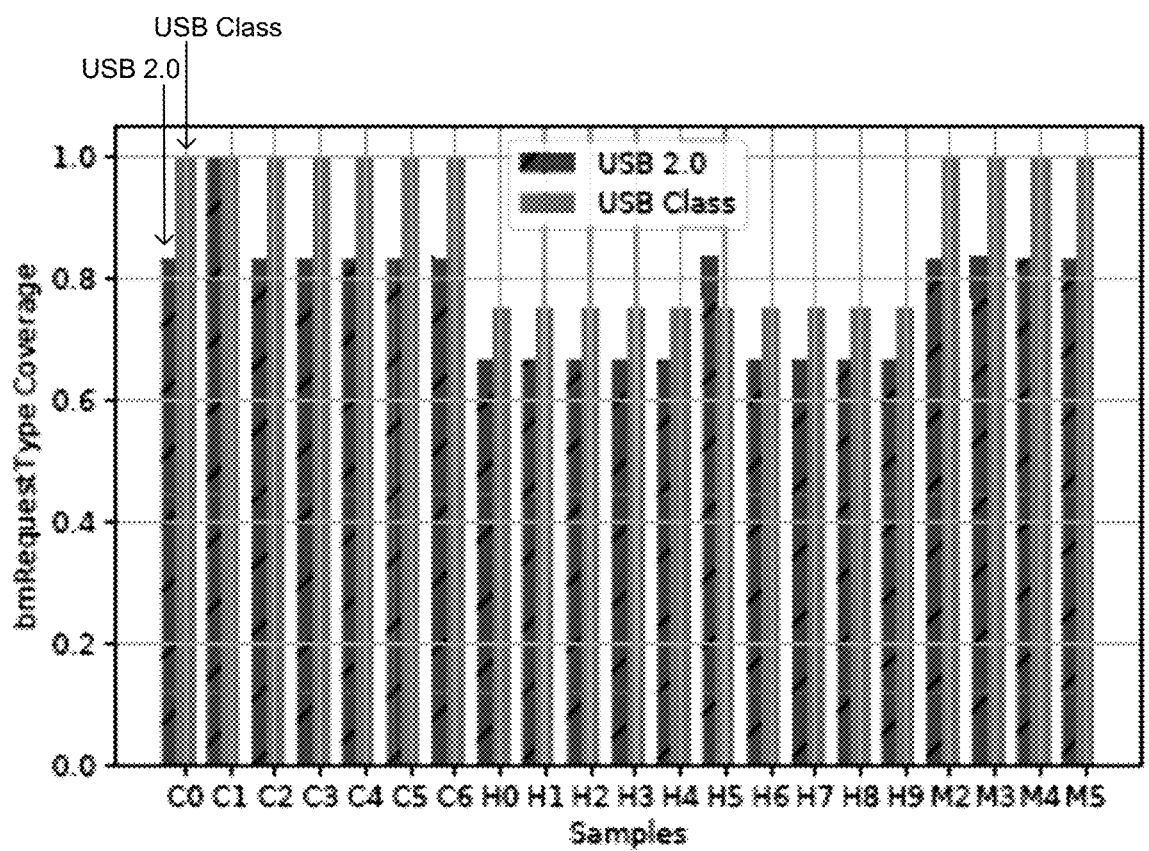
FIGS. 6-7 are diagrams displaying value coverage found in bRequest constraints across different USB specifications during experimental testing of an exemplary firmware analysis system in accordance with embodiments of the present disclosure.
Figure 7:
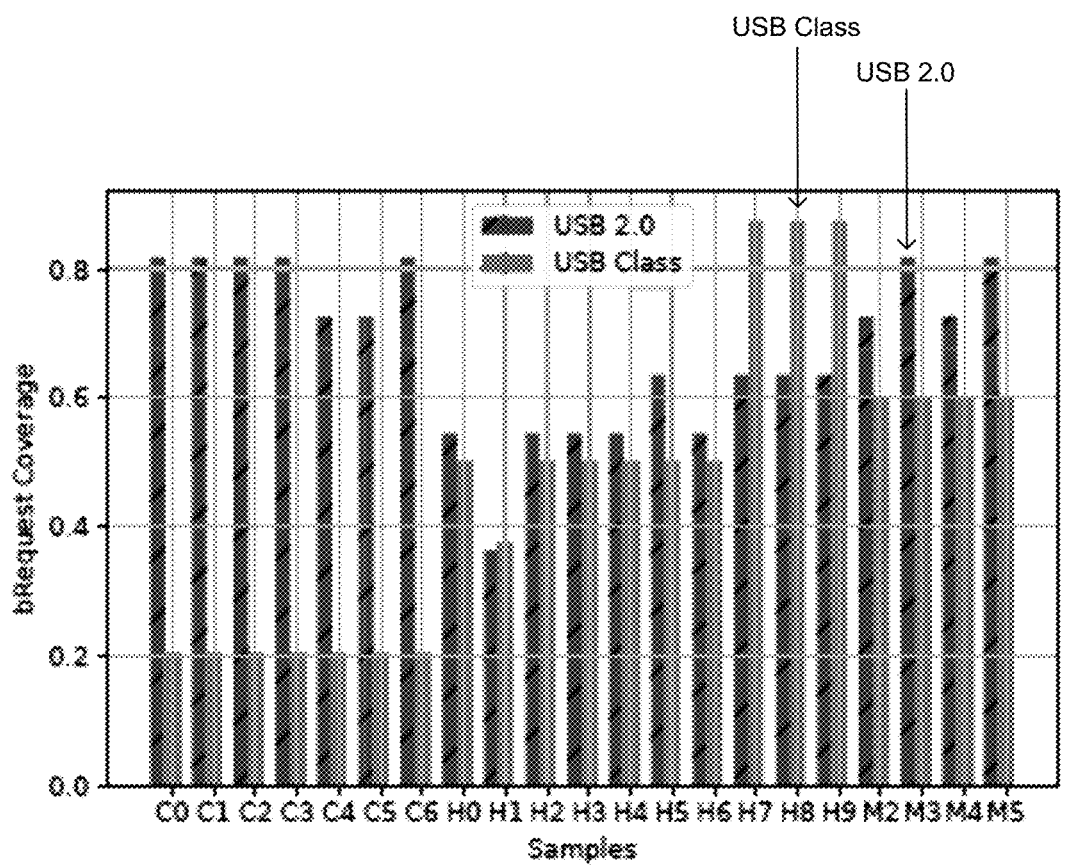

As shown in FIG. 6, every firmware in our training set has over 60% coverage of the USB 2.0 specification and over 70% coverage of other USB class specifications respectively on bmRequestType. For bRequest shown in FIG. 7, most firmware except the CDC class have over 50% coverage of different USB specifications. Again, the coverage limitation of the CDC class is due to its sub protocol variations defined by the specification. Note that wValue and wIndex and were not included in our ground truth study, because although important, these fields depend on bRequest rather than being self-contained.

In summary, although there was not 100% coverage for all possible values of each field defined by the specifications, our constraints performed well in covering the most common values (e.g., standard requests) of the most important fields (e.g., bRequestType), which help pinpoint the usage of USB protocol and potential functionality with a high confidence. The study of the training set demonstrated that each firmware does provide a lot of information about different USB specifications, which is the basis of the protocol constraint model extraction methodology using firmware in accordance with the embodiments of the present disclosure. Although the constraints from the most commonly available firmware images were extracted, other firmware images that contain less common functionality, e.g., PSTN, can be used to improve the constraint set and its coverage.

In general, it may be difficult to identify the variables that implement the protocol fields for an arbitrary firmware, since the source code may not be available. However, it has been demonstrated (e.g., using Algorithm 2) that embodiments of the present disclosure can discover the protocol fields with high precision. If we compute the precision of matching a protocol field p f in a given firmware as $$100 \times \frac{\begin{cases} 1 & rc \in M_{best}(pf) \\ 0 & \text{otherwise} \end{cases}}{|M_{best}(pf)|}$$

where rc denotes the actual variable that implements p f and $M_{best}$ is the output of Algorithm 2, Table 5 (below) shows the field discovery data for the four composite firmware from the MSP430 SDK.

TABLE 5

| Protocol Fields | Mapped Firmware Fields | Precision | | |
|---|---|---|---|---|
| | | Min. | Max. | Avg. |
| bmRequestType | bmRequestType | 100% | 100% | 100% |
| bRequest | bRequest, wLength | 0% | 100% | 100% |
| wValue | wValue | 100% | 100% | 100% |
| wIndex | wIndex | 100% | 100% | 100% |
| wLength | wLength | 100% | 100% | 100% |

The table shows that all fields, except the bRequest field as sometimes another field, wLength, yielded a higher matching frequency. However, we achieve 100% precision in the discovery of the remaining protocol fields.

Table 6 shows the field discovery data for the Intel 8051 firmware. Compared to MSP430 benchmarks, less precision was achieved for protocol field discovery. However, ProXray was able to discover one protocol field, wValue, for each Intel 8051 firmware with 100% precision and an additional protocol field, bRequest, for BadUSB firmware with a precision of 50%. In case of EzHID firmware the first 3 fields were mapped with 100% accuracy. We found that in all of the 0% precision cases, such as wLength for both, the actual field was matched as a candidate. However, the correct mapping that was not selected as another variable that corresponded to a different field (wValue for BadUSB, wValue, bRequest for EzHID) had a higher score and prevented the correct candidate from being included in the final set.

TABLE 6

| Firmware | Protocol Field | Firmware Field | Precision |
|---|---|---|---|
| BadUSB | bmRequestType | wValue | 0% |
| | bRequest | bRequest, wValue | 50% |
| | wValue | wValue | 100% |
| | wIndex | wLength, wValue | 0% |
| | wLength | wValue | 0% |
| EzHID | bmRequestType | bmRequestType | 100% |
| | bRequest | bRequest | 100% |
| | wValue | wValue | 100% |
| | wIndex | SM0 | 0% |
| | wLength | bRequest, wValue | 0% |

Field discovery for the firmware in the training set (of 23 known firmware) was evaluated by excluding the firmware under analysis from the protocol constraint model extraction phase and by using the protocol constraint model extracted from the remaining 22 firmware. Table 7 (below) shows that similar precision values compared to those for the composite MSP430 firmware are able to be achieved.

TABLE 7

| Protocol Fields | Mapped Firmware Fields | Precision | | |
|---|---|---|---|---|
| | | Min. | Max. | Avg. |
| bmRequestType | bmRequestType | 100% | 100% | 100% |
| bRequest | bRequest, wLength | 50% | 100% | 95.45% |
| wValue | wValue | 100% | 100% | 100% |
| wIndex | wIndex | 100% | 100% | 100% |
| wLength | wLength, wValue, bRequest | 0% | 100% | 79.54% |

Based on the extracted protocol constraint model in accordance with embodiments of the present disclosure, the efficiency of a symbolic execution engine is increased in terms of exploring the required paths/code locations in a goal based execution, where the goal is described in terms of a generic protocol constraint. This is different from preconditioned symbolic execution, where the constraint is expressed in terms of the variables/memory locations of the system under test. An exemplary field mapping phase automatically discovers potential mappings and rewrites the constraints based on these potential mappings. So, an exemplary protocol constraint model guided symbolic execution phase involves the field mapping phase and uses the same experimental setup (that uses the 23 MSP430 firmware as the training set and six firmware from both MSP430 and Intel 8051 architecture as the testing set).

In evaluating the protocol constraint model guided symbolic execution phase, several protocol relevant targets were identified in our benchmarks. For MSP430 firmware, we identified protocol relevant targets T1-T5 shown in Table 8 (below).

TABLE 8

| Targets | Constraint (C) |
|---|---|
| T1 | (bmRequestType & 0x80) != 0 |
| T2 | C(T1) $\wedge$ (bRequest == 0x06) |
| T3 | C(T2) $\wedge$ (wValue == 0x01) |
| T4 | C(T3) $\wedge$ (wIndex == 0) |
| T5 | C(T4) $\wedge$ (wLength == 0) |

Figure 8:
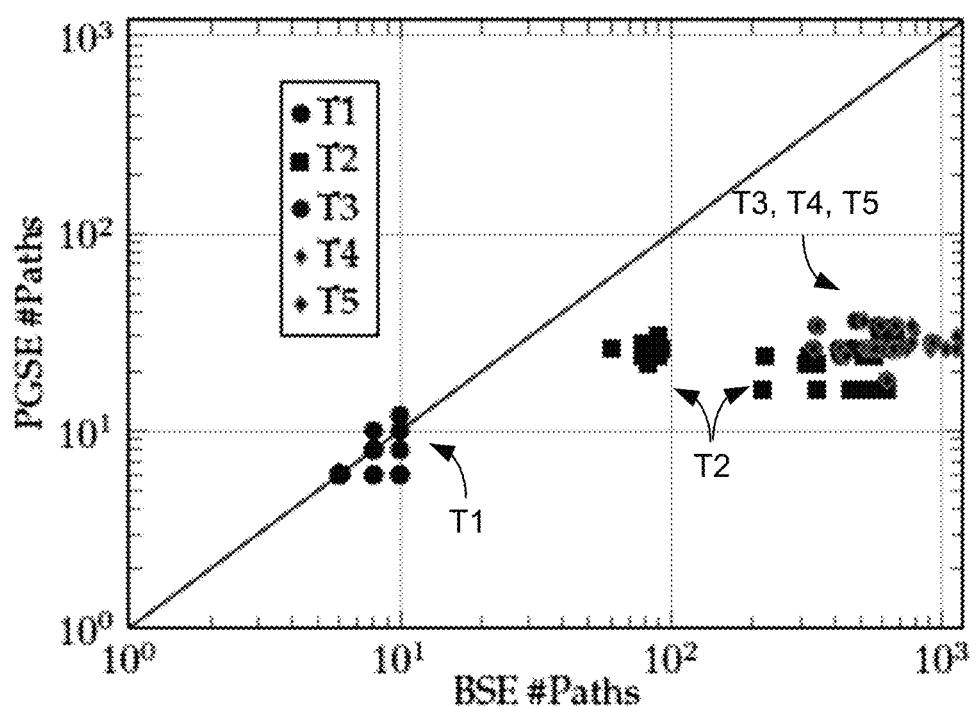
FIG. 8 is a diagram displaying a number of paths generated for an exemplary firmware analysis system in accordance with embodiments of the present disclosure versus a baseline comparison.
Figure 9:
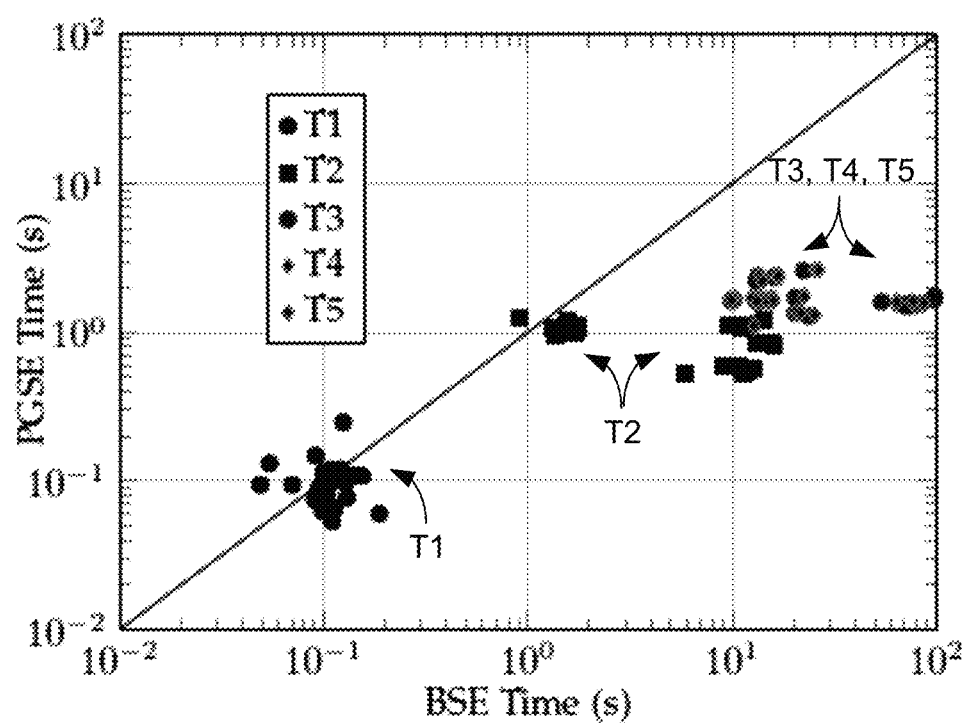
FIG. 9 is a diagram displaying times to reach set targets for an exemplary firmware analysis system in accordance with embodiments of the present disclosure versus a baseline comparison.

As seen from FIG. 8, a great reduction was achieved in the number of paths that are relevant to the protocol functionality of interest. During experimental testing, ProXray was able to achieve up to 73.8× speedup (T5 in C1) as shown in FIG. 9 and its guided execution could reach target T5 in a minimum of 1.106 s (9.883 s minimum for BSE) to a maximum of 2.624 s (121.866 s maximum for BSE). The number of paths in this case ranged from a minimum of 18 (336 for BSE) to maximum 36 (1134 for BSE). In case of timing for T1, there are a few cases where PGSE (Protocol (constraint model) Guided Symbol Execution) times are marginally higher than BSE. It is because of the depth of the code point corresponding to T1. Since the code location is not that deep within execution, BSE and PGSE have similar results. The deeper the code location gets with respect to execution the better PGSE performs by eliminating irrelevant code.

Table 9 (below) and Table 10 (below) shows the constraint based targets for Intel 8051 test firmware BadUSB and EzHID respectively. Table 9 shows that it took 126 paths in 26.63 s to reach T8 compared to 236 paths in 32.852 s for BSE.

TABLE 9

| Targets | Constraint (C) |
|---|---|
| T1 | (bmRequestType & 0x40) == 0 |
| T2 | (bmRequestType & 0x20) == 0 |
| T3 | ((bmRequestType & 0x60) == 0) $\wedge$ (bRequest == 0x05) |
| T4 | ((bmRequestType & 0x60) == 0) $\wedge$ (bRequest == 0x09) |
| T5 | (bRequest == 0x06) $\wedge$ (wValue == 0x01) |
| T6 | (bRequest == 0x06) $\wedge$ (wValue == 0x02) |
| T7 | (bRequest == 0x06) $\wedge$ (wValue == 0x06) |
| T8 | (bRequest == 0x06) $\wedge$ (wValue == 0x22) |

TABLE 10

| Targets | Constraint (C) |
|---|---|
| T1 | (bmRequest == 0x06) $\wedge$ (wValue == 0x01) |
| T2 | (bmRequest == 0x06) $\wedge$ (wValue == 0x02) |

TABLE 10-continued

| Targets | Constraint (C) |
|---|---|
| T3 | (bmRequest == 0x06) ∧ (wValue == 0x03) |
| T4 | (bmRequest == 0x06) ∧ (wValue == 0x21) |
| T5 | (bmRequest == 0x06) ∧ (wValue == 0x22) |

Figure 10:
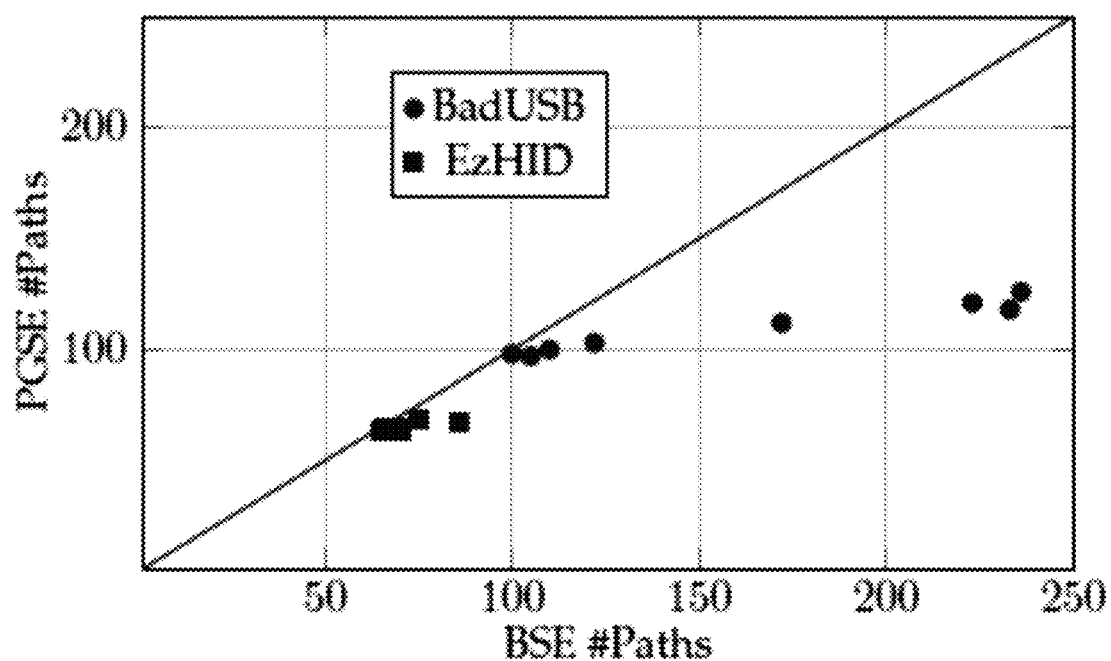
FIG. 10 is a diagram displaying a number of paths generated for an exemplary firmware analysis system for various USB firmware in accordance with embodiments of the present disclosure versus a baseline comparison.
Figure 11:
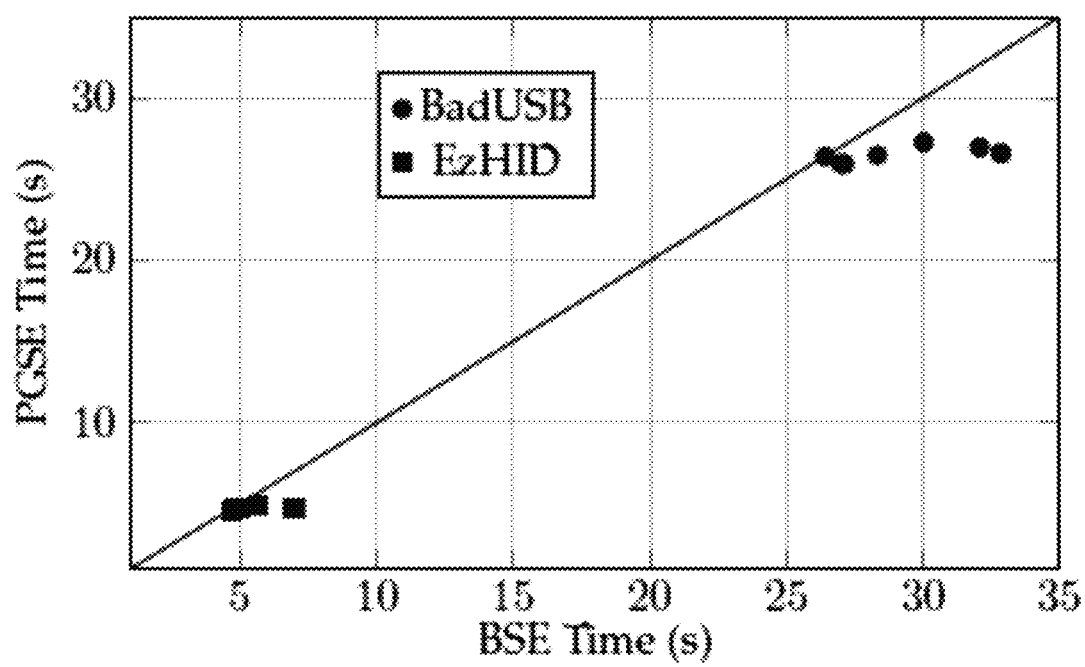
FIG. 11 is a diagram displaying times to reach a set target for an exemplary firmware analysis system for various USB firmware in accordance with embodiments of the present disclosure versus a baseline comparison.

From Table 1, it is also evident that BadUSB Firmware has much lower number of lines of code compared to the MSP430 firmware. Smaller code is easier for BSE to explore compared to exploring code with a high line count and more conditional paths. In case of EzHID firmware, there is not much difference between PGSE and BSE in that it took 67 paths in 4.78 s to reach T5 from Table 10 compared to 86 paths in 6.98 s for BSE. FIG. 10 and FIG. 11 show the performance of PGSE compared to BSE for the Intel 8051 test firmware. In almost all cases, PGSE has shown improvement over BSE both in terms of number of paths and time to reach targets.

In order to assess the performance of constraint model based functional classification on unknown firmware by an exemplary firmware analysis system, the capability of identifying the USB subclasses implemented by a given USB firmware was evaluated in order to be able to report the types of functionalities a firmware can support. For this purpose, we identified the class specific constraints in the model by automatically removing those that appear in more than one subclass and recorded the associated subclass type for each class specific constraint. Therefore, in our benchmarks, we came across three USB subclasses: CDC, HID, and MSC, and Table 11 (below) shows CDC, HID, and MSC specific constraints that were extracted from the 23 MSP430 firmware.

TABLE 11

| Type | Type Specific Constraints |
|---|---|
| CDC | bRequest ∈ {32, 33, 34} |
| HID | bRequest == 2 ∨ wValue ∈ {33, 34} |
| MSC | bRequest ∈ {254, 255} |

During testing, protocol field discovery of the test firmware was done in the same process as explained in Algorithm 2. Protocol constraint model guided symbolic execution was then used to find protocol functionality by matching the type of class specific constraints shown in Table 12 (below).

TABLE 12

| Firmware | Matched Constraints | Class |
|---|---|---|
| EzHID | wValue == 33 | HID |
|  | wValue == 34 | HID |
| BadUSB | bRequest == 254 | MSC |
|  | wValue == 34 | HID |

All paths in the firmware were evaluated against these constraints in Table 12. Accordingly, if a firmware was found to conform to a specific constraint of any functionality type, the firmware was reported as implementing that functionality. Using this process, the functionality type for every MSP430 and Intel 8051 firmware in our benchmarks was correctly identified and was able to match all functionalities of the four composite firmware. The importance of this can be seen in case of BadUSB firmware, in which ProXray was able to find that it implements HID functionalities in addition to its reported MSC functionality which indicates that the firmware has a malicious aspect.

In various embodiments, an exemplary firmware analysis system and method in accordance with the present disclosure can support any symbolic execution based firmware analysis with a priori extracted protocol constraint information, including FIE, AVATAR, Firmalice, and FirmUSB. Advantageously, the program analysis phase of an exemplary firmware analysis system/method discovers associations between the protocol fields and the memory locations. This information is used in guiding symbolic execution by prioritizing paths that produce constraints of the protocol model. In an exemplary approach, constraint normalization enables efficient computation of constraint coverage and simplifies the formal representation of the protocol. By applying an exemplary firmware analysis system/method (ProXray) to the USB protocol and evaluating ProXray using the firmware that runs on MSP430 and Intel 8051 micro-controllers, experimental results show up to 73.8 times speedup in reaching USB protocol related targets for MSP430 firmware and 1.5 times speedup for 8051 firmware.

Certain embodiments of an exemplary firmware analysis system and method of the present disclosure utilizes source files of the firmware to map program variables into protocol fields during the training phase. However, since access to the source file might be infeasible due to various reasons, certain embodiments of the firmware analysis system/method includes binary parsing/mapping support and is configured to recover the protocol fields from the binary format of the firmware using static analysis, such as by searching for certain binary patterns from within the binary version of the firmware (e.g., the binary pattern of a USB setup packet).

In certain embodiments, the quality of the extracted protocol constraint model can be improved by enriching the training set and can be adapted to protocols that involve relational constraints by incorporating prioritization heuristics that can compare two paths with respect to the potential for covering richer relational constraints in the protocol constraint model extraction phase and/or matching heuristics that consider pairwise associations in the potential mappings for the protocol field discovery phase. From experimental data, constraint-based search prioritization heuristics of the present disclosure perform better than the baseline symbolic execution and extract up to 1.54 times more unique constraints on average.

Figure 12:
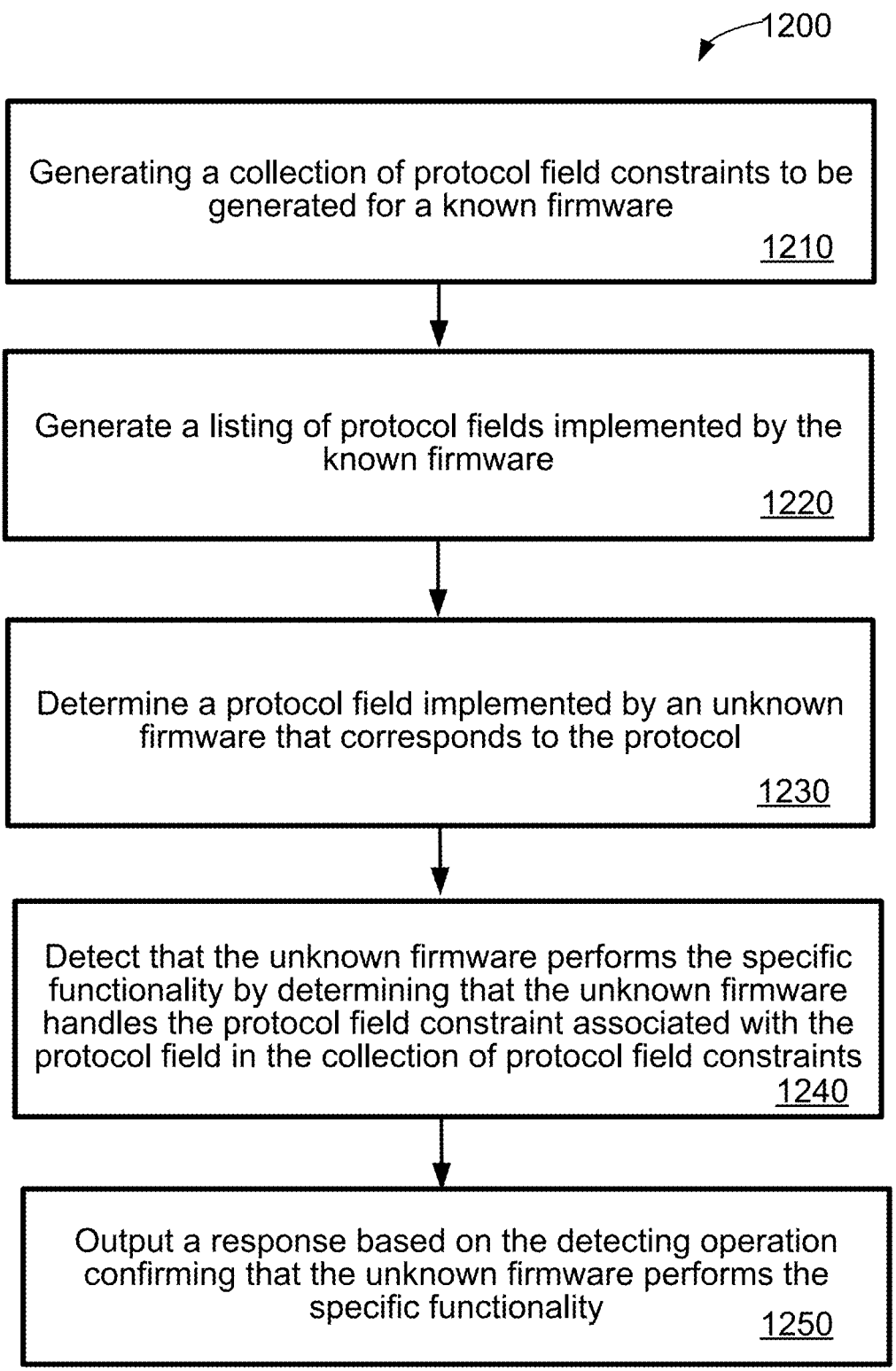
FIG. 12 is a flow chart diagram illustrating an exemplary firmware analysis method in accordance with embodiments of the present disclosure

Next, the flow chart of FIG. 12 shows an exemplary firmware analysis method in accordance with embodiments of the present disclosure. The method 1200 of FIG. 12 comprises a computing device 1300 (FIG. 13) (or a protocol model extraction module 1320 of the same or a different computing device) generating (1210) a collection of protocol field constraints (e.g., protocol constraint model) to be generated for a known firmware, wherein a protocol field constraint represents a specific functionality of a protocol implemented by the known firmware and the collection of protocol field constraints is written in terms of protocol fields. Further, the computing device 1300 (or a protocol field discovery module 1330) may generate (1220) a listing of protocol fields used by the protocol implemented by the known firmware (e.g., by mapping program variables utilized by the known firmware to the protocol fields). The computing device 1300 (or a protocol guided symbolic execution module 1340 of the same or a different computing device) may then determine (1230) one or more protocol fields implemented by the unknown firmware that correspond to the protocol. Then, the computing device 1300 (or the protocol guided symbolic execution module 1340 of the same or a different computing device), can detect (1240) that the unknown firmware performs the specific functionality by determining that the unknown firmware handles the protocol field constraint associated with the protocol field in the collection of protocol field constraints. Also, the computing device 1300 (or the protocol guided symbolic execution module 1340 of the same or a different computing device) can output (1250) a response based on the detecting operation confirming that the unknown firmware performs the specific functionality.

The protocol model extraction module 1320, the protocol field discovery module 1330, and/or the protocol guided symbolic execution module 1340 can be implemented in software (e.g., firmware), hardware, or a combination thereof. For example, in an exemplary mode, one or more of the modules are implemented in software, as an executable program, and are executed by a special or general purpose digital computer. An example of a computer that can implement such modules 1320-1340 of the present disclosure is shown in FIG. 13.

Generally, in terms of hardware architecture, as shown in FIG. 13, the computer 1300 includes a processor 1310, memory 1350, and one or more input and/or output (I/O) devices 1380 (or peripherals) that are communicatively coupled via a local interface 1360. The local interface 1360 can be, for example but not limited to, one or more buses or other wired or wireless connections, as is known in the art. The local interface 1360 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1310 is a hardware device for executing software, particularly that stored in memory 1350. The processor 1310 can be any custom made or commercially available processor, a central processing unit (CPU), an auxiliary processor among several processors associated with the computer 1300, a semiconductor based microprocessor (in the form of a microchip or chip set), a macroprocessor, or generally any device for executing software instructions.

The memory 1350 can include any one or combination of volatile memory elements and nonvolatile memory elements. Moreover, the memory 1350 may incorporate electronic, magnetic, optical, and/or other types of storage media. Note that the memory 1350 can have a distributed architecture, where various components are situated remote from one another, but can be accessed by the processor 1310.

The software in memory 1350 may include one or more separate programs, each of which comprises an ordered listing of executable instructions for implementing logical functions. In the example of FIG. 13, the software in the memory 1350 includes a protocol model extraction module 1320, a protocol field discovery module 1330, and a protocol guided symbolic execution module 1340 in accordance with an exemplary embodiment, and a suitable operating system (O/S) 1370. The operating system 1370 essentially controls the execution of other computer programs and provides scheduling, input-output control, file and data management, memory management, and communication control and related services.

The I/O devices 1380 may include input devices, for example but not limited to, a keyboard, mouse, scanner, microphone, etc. Furthermore, the I/O devices 1380 may also include output devices, for example but not limited to, a printer, display, etc. Finally, the I/O devices 1380 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

When the computer 1300 is in operation, the processor 1310 is configured to execute software stored within the memory 1350, to communicate data to and from the memory 1350, and to generally control operations of the computer 1300 pursuant to the software. The protocol model extraction module 1320, the protocol field discovery module 1330, the protocol guided symbolic execution module 1340 and the O/S 1370, in whole or in part, but typically the latter, are read by the processor 1310, perhaps buffered within the processor 1310, and then executed.

Any process descriptions or blocks in flow charts should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

In various embodiments, a firmware analysis program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, device, or medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of certain embodiments of the present disclosure includes embodying the functionality of the firmware analysis system in logic embodied in hardware or software-configured mediums.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the principles of the present disclosure. All such modifications and variations are intended to be included herein within the scope of this disclosure and the present disclosure and protected by the following claims.

The invention claimed is:

1. A method comprising:
   determining, by a computing device, protocol fields used by a protocol implemented by a known firmware;
   generating, by the computing device, a protocol constraint model comprising a collection of protocol field constraints for the known firmware without having a formal specification of the known firmware, wherein a protocol field constraint represents a specific functionality of the protocol implemented by the known firmware;
   analyzing, by the computing device using symbolic execution, an unknown firmware and detecting a particular functionality of the unknown firmware by determining that the unknown firmware handles the protocol field constraint in the protocol constraint model of the collection of protocol field constraints;
   identifying, by the computing device, a set of candidate program variables for the unknown firmware that possibly correspond to a protocol field used by the known firmware;
   selecting, by the computing device, a program variable from the set of candidate program variables having a highest frequency of occurrence as a match for the protocol field used by the unknown firmware; and
   generating, by the computing device, a report identifying the detected functionality of the protocol that is supported by the unknown firmware.

2. The method of claim 1, further providing a mapping of program variables for the unknown firmware that corresponds to protocol fields used by the protocol.

3. The method of claim 2, wherein providing the mapping of program variables comprises scanning a source code of the unknown firmware for program variables and associating the program variables in the unknown firmware to protocol fields.

4. The method of claim 1, wherein the collection of protocol field constraints is written in terms of protocol fields.

5. The method of claim 1, wherein the collection of protocol field constraints is generated during execution of the known firmware.

6. The method of claim 1, further comprising exploring program paths in the unknown firmware that implement protocol related functionality.

7. The method of claim 1, further comprising:
   receiving, by the computing device, a functionality query for the unknown firmware; and
   outputting, by the computing device, a response to the functionality query based on the analyzing and detecting step.

8. The method of claim 1, further comprising:
   recovering protocol fields from a binary format of the known firmware using static analysis.

9. The method of claim 8, wherein the static analysis comprises searching for certain binary patterns from within the binary format of the known firmware.

10. A firmware analysis system comprising:
    a computer processor;
    a first memory storage element storing instructions to implement a protocol model extraction phase of firmware analysis, wherein the instructions, when executed by the computer processor, cause a collection of protocol field constraints to be generated for a known firmware, wherein a protocol field constraint represents a specific functionality of a protocol implemented by the known firmware and the collection of protocol field constraints is written in terms of protocol fields; and
    a second memory storage element storing instructions to implement a protocol field discovery phase of the firmware analysis, wherein the instructions, when executed by the computer processor, cause a listing of protocol fields used by the protocol implemented by the known firmware to be generated, wherein the instructions, when executed by the computer processor, cause the computer processor to identify a set of candidate program variables for an unknown firmware that possibly correspond to the protocol field used by the known firmware; and select a program variable from the set of candidate program variables having a highest frequency of occurrence as a match for the protocol field used by the known firmware; and
    a third memory storage element storing instructions to implement a protocol guided symbolic execution stage of the firmware analysis, wherein the instructions, when executed by the computer processor, cause the computer processor to:
       determine a protocol field implemented by the unknown firmware;
       detect that the unknown firmware performs the specific functionality by determining that the unknown firmware handles the protocol field constraint associated with the protocol field in the collection of protocol field constraints; and
       generate a report identifying the detected functionality of the protocol that is supported by the unknown firmware.

11. The system of claim 10, wherein the collection of protocol field constraints is written in terms of protocol fields.

12. The system of claim 10, wherein the collection of protocol field constraints is generated during execution of the known firmware.

13. The system of claim 10, wherein the third memory storage element further stores instructions, when executed by the computer processor, cause the computer processor to explore program paths in the unknown firmware that implement protocol related functionality.

14. The system of claim 10, wherein the third memory storage element further stores instructions, when executed by the computer processor, cause the computer processor to receive a functionality query for the unknown firmware; and output a response to the functionality query based on the detecting operation.

15. The system of claim 10, wherein the first memory storage element further stores instructions, when executed by the computer processor, cause the computer processor to recover protocol fields from a binary format of the known firmware using static analysis.

16. The system of claim 15, wherein the static analysis comprises searching for certain binary patterns from within the binary format of the known firmware.

17. A non-transitory computer readable storage medium having instructions stored thereon that, in response to execution by a computing device, cause the computing device to perform operations comprising:
    determining protocol fields used by a protocol implemented by a known firmware;
    generating a protocol constraint model comprising a collection of protocol field constraints for the known firmware without having a formal specification of the known firmware, wherein a protocol field constraint represents a specific functionality of the protocol implemented by the known firmware;

analyzing, using symbolic execution, an unknown firmware and detecting a particular functionality of the unknown firmware by determining that the unknown firmware handles the protocol field constraint in the protocol constraint model of the collection of protocol field constraints;

identifying a set of candidate program variables for the unknown firmware that possibly correspond to a protocol field used by the program;

selecting a program variable from the set of candidate program variables having a highest frequency of occurrence as a match for the protocol field used by the unknown firmware; and generating a report identifying the detected functionality of the protocol that is supported by the unknown firmware.

18. The non-transitory computer readable storage medium of claim 17, wherein the operations further comprise receiving a functionality query for the unknown firmware; and outputting a response to the functionality query based on the analyzing and detecting step.

19. The non-transitory computer readable storage medium of claim 17, wherein the operations further comprise recovering protocol fields from a binary format of the known firmware using static analysis.

20. The non-transitory computer readable storage medium of claim 19, wherein the static analysis comprises searching for certain binary patterns from within the binary format of the known firmware.

* * * * *